May 5, 1970     F. C. ERKE     3,510,142

INFLATABLE TANK AND CARRIER MEANS THEREFOR

Filed Sept. 26, 1967

INVENTOR.
FREDERICK C. ERKE

BY *W. B. Hausman*

ATTORNEY

United States Patent Office 3,510,142
Patented May 5, 1970

3,510,142
INFLATABLE TANK AND CARRIER MEANS THEREFOR
Frederick C. Erke, 706 Perkinswood SE.,
Warren, Ohio 44483
Filed Sept. 26, 1967, Ser. No. 670,739
Int. Cl. B60p 3/22
U.S. Cl. 280—5                                 4 Claims

ABSTRACT OF THE DISCLOSURE

A portable, collapsible tank having an inflatable double walled construction with tie-down means secured thereto.

---

This invention relates to tanks for transporting various fluids and dry powder solids and the like, and more particularly to a tank which may be collapsed and stored in a relatively small place, as for example, on a return trip to a point of refilling.

The principal object of the invention is the provision of a double walled inflatable tank structure with integral tie-down means for mounting the same on a suitable carrier.

A further object of the invention is the provision of a lightweight collapsible tank structure formed of flexible liquid impervious material which may be inflated by means of a hollow wall construction so as to form a suitable tank for various liquids and the like.

A still further object of the invention is the provision of a collapsible portable tank and trailer combination, and wherein a flat bed trailer of a type adapted to be towed by a truck or tractor is provided with a collapsible and extendable double walled inflatable tank structure which may be moved to one end of said flatbed trailer so as to make the trailer available for other uses, and alternately inflated and extended over the flatbed trailer where it serves as a tank for various fluids and the like.

The inflatable collapsible tank structure disclosed herein makes possible the utilization of truck trailers and the like for one way loads, where liquids and/or dry powders including flour and other granular materials may be readily transported in one direction and the tank collapsed and moved to a relatively small area, permitting the trailer to be utilized for hauling other loads in the opposite direction.

It is known in the art that inflatable tank structures have been proposed and used, and such structures have comprised hollow devices wherein the material being transported served to inflate the tank. In the present disclosure the tank is formed with inflatable double walls so that it is inflatable to become a tank in size and shape and carrying capacity prior to the positioning of any liquid or powder material therein.

The invention is illustrated in the accompanying drawing, wherein.

Figure 1:
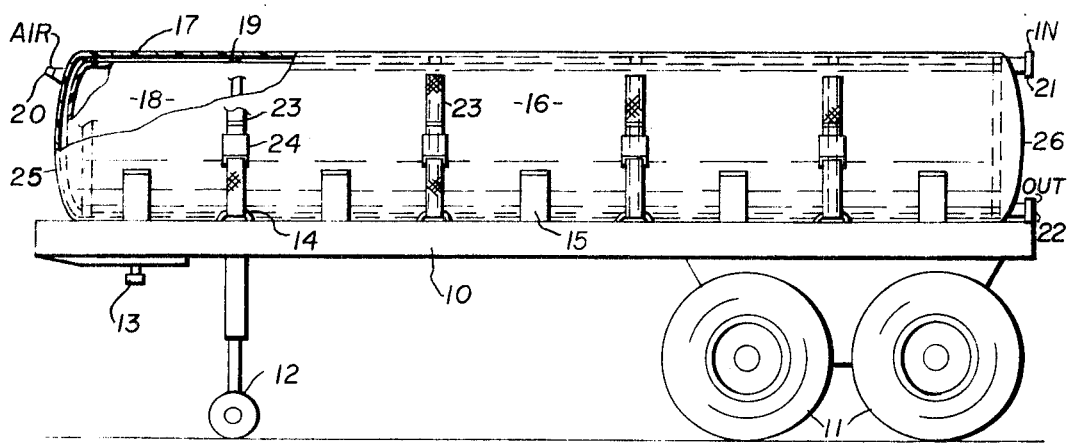
FIG. 1 is a side elevation with parts broken away and parts in cross section illustrating the inflatable tank in inflated semi-rigid condition positioned on a carrier.

By referring to the drawings and FIG. 1 in particular, it will be seen that a flatbed trailer 10 has been disclosed which is supported by ground engaging wheels 11 and by a temporary support wheel 12. A fifth wheel engaging structure 13 such as typical on trailer constructions is incorporated so that the trailer 10 may be attached to and moved by a truck or tractor, as known in the art.

The upper surface of the flatbed trailer 10 is provided with a plurality of eyelets 14 along its longitudinal edges and inwardly thereof there are a plurality of collapsible angular supports 15.

A double walled inflatable tank structure generally indicated by the numeral 16 is positioned on the flatbed trailer longitudinally thereof and consists of an outer flexible tank-shaped member 17 and an inner smaller flexible tank-shaped member 18. The tank-shaped members 17 and 18 are spaced with respect to one another and secured to one another by means of interconnecting webs 19 and the space between the outer and inner tank-shaped members 17 and 18 comprises a chamber into which compressed air may be introduced as by way of a fitting 20, so that the outer tank-shaped flexible member 17 will expand and assume a cylindrical shape with the inner flexible member 18 defining an inner impervious wall capable of receiving and retaining various liquids or dry powdered materials, as will occur to those skilled in the art. One or more filler ports 21 are provided communicating with the interior of the inner member 18 and one or more outlet ports 22 are similarly provided so that various liquids or powdered materials can be directed into the tank formed by the device when inflated and removed therefrom.

Figures 3, 4:
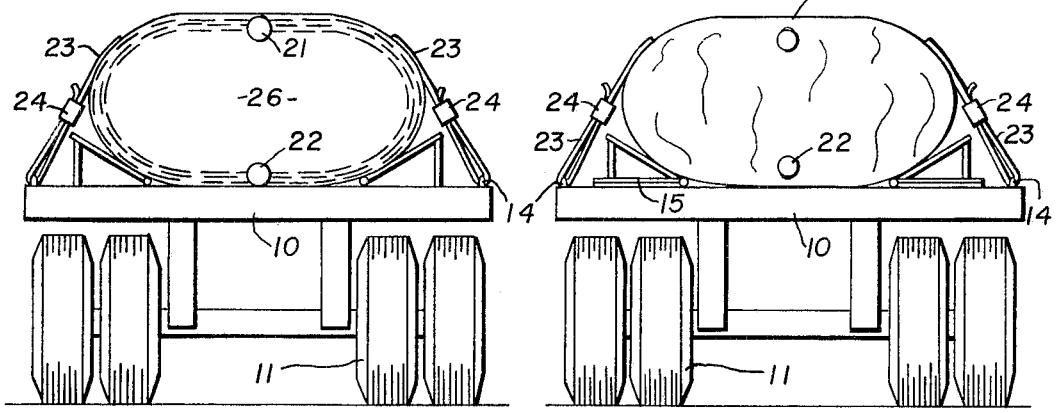
FIG. 3 is an end view of the inflated tank and carrier seen in FIG. 1.
FIG. 4 is an end view of the semi-collapsed inflatable tank of FIG. 2 of the drawings.

In order that the tank when inflated and when filled with materials such as liquid may be securely positioned on the flatbed trailer 10, a plurality of flexible straps 23 are attached to the upper portion of the tank-like structure 16 in oppositely disposed relation, as best seen in FIG. 3 of the drawings. Each of these flexible straps 23 is adapted to be positioned through one of the eyelets 14 and then secured by means of a suitable clamping device 24. It will also be seen that the configuration of the tank is preferably such that it will be partially engaged against and supported by the plurality of angular supports 15 heretofore noted as being provided on the upper surface of the flatbed of the trailer 10. The inflatable tank 16 is provided with end walls 25 and 26 respectively, which are integrally formed with the outer member 17, and the inner member 18 has comparable end walls spaced with respect thereto so that the introduction of compressed air into the areas between the members 17 and 18 will move the same into a predetermined semi-rigid shape, as shown in FIG. 1 of the drawings.

Figure 2:
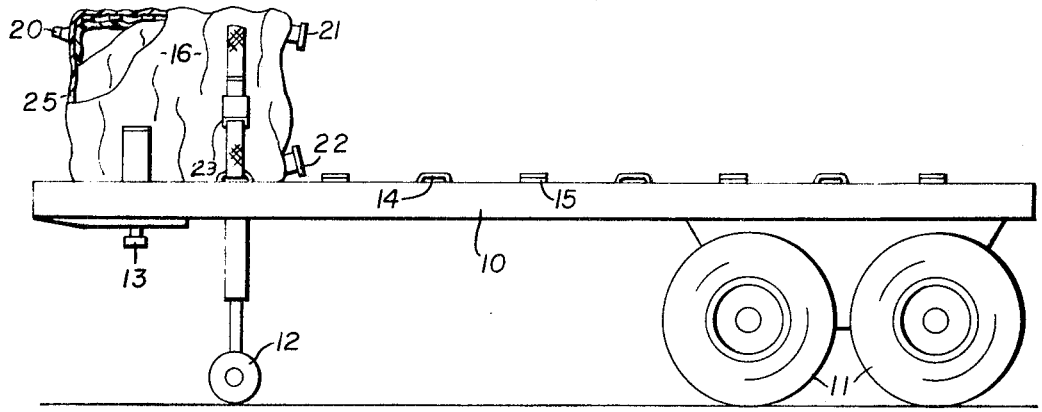
FIG. 2 is a side elevation with parts broken away and parts in cross section illustrating the inflatable tank in collapsed and retracted position on the carrier.

By referring now to FIG. 2 of the drawings, the inflatable tank 16 may be seen in uninflated collapsed condition and moved to a relatively small area at one end of the trailer 10. It will occur to those skilled in the art that the degree of collapsability of the inflatable tank 16 will depend upon the choice of the flexible impervious materials used in the formation of the inner and outer members 17 and 18, and the degree of evacuation of the air therebetween. In FIG. 2 of the drawings, the collapsed and partially compacted tank 16 will be seen to provide a majority of the trailer with usable space for other loads.

In FIG. 3 of the drawings, the end view of the inflatable tank 16 is illustrated with the back end wall 26 in plan view and the oval configuration of the tank may be seen. It will occur to those skilled in the art that the configuration of the inflatable tank may be varied from that shown without departing from the spirit of the invention.

In FIG. 4 of the drawings, the semi-collapsed inflatable tank 16 may be seen.

It will occur to those skilled in the art that the collapsible tank may comprise rigid front and back end walls with the flexible cylindrical walls attached thereto, and that the flexible traps 23 may be separate from the tank itself and positioned to hold the same.

It will thus be seen that an air inflatable collapsible tank structure has been disclosed which is particularly suitable for hauling various liquids and powdered materials, and that the structure disclosed meets the several objects of the invention. Having thus disclosed my invention, what I claim is:

1. A self-erecting flexible collapsible tank comprising a pair of horizontally disposed flexible impervious tubular members, one positioned inside the other in spaced relation thereto, means connecting said flexible impervious members to one another at intervals and means for introducing compressed air into the area therebetween, end closures for said tubular members attached thereto, inlet and outlet means communicating with the interior of said inside member, flexible straps having longitudinally extending portions secured to the exterior of said flexible collapsible tank in spaced relation to one another and portions thereof extending away from said flexible collapsible tank for holding said tank on a support means whereby intermediate portions of said flexible collapsible tank act as tension members between the ends of said flexible straps.

2. The self-erecting collapsible tank of claim 1 wherein said straps are arranged in oppositely disposed pairs and act with intermediate sections of said tank to form retention bands partly encircling said tank when inflated.

3. The self-erecting collapsible tank of claim 1 and wherein said end closures are double walled flexible members with the area between said double walled communicating with the area between said tubular members.

4. The combination of a self-erecting flexible collapsible tank and a support means therefor, said tank comprising a pair of horizontally disposed flexible impervious tubular members, one positioned inside the other in spaced relation thereto, means connecting said flexible impervious members to one another at intervals and means for introducing compressed air into the area therebetween, end closures for said tubular members attached thereto, inlet and outlet means communicating with the interior of said inside member, flexible straps having longitudinally extending portions secured to the exterior of said flexible collapsible tank in spaced relation to one another and portions thereof extending away from said flexible collapsible tank for holding said tank on said support means, said support means including a vehicle with a flat bed for receiving said tank, collapsible supports along the sides of said vehicle movable from a first position adjacent said flat bed to a second position in angular relation thereto and against the sides of said flexible collapsible tank when erected, fasteners on said flat bed, said portions of said flexible straps extending away from said flexible collapsible tank being removably engaged by said fasteners.

References Cited

UNITED STATES PATENTS

| | | | |
|---|---|---|---|
| 1,229,884 | 6/1917 | Caughey. | |
| 1,231,074 | 6/1917 | Scott et al. | |
| 3,025,073 | 3/1962 | Hickman | 280—5 |
| 3,044,515 | 7/1962 | Eades | 150—1 |
| 3,095,206 | 6/1963 | Fresia | 280—5 |
| 3,197,236 | 7/1965 | Burton | 280—179 |
| 3,206,076 | 9/1965 | Brackett. | |
| 1,191,762 | 7/1916 | Conant | 248—361 |
| 2,376,336 | 5/1945 | Brown | 280—5 |
| 2,736,356 | 2/1956 | Bender et al. | 150—0.5 |

FOREIGN PATENTS

| | | |
|---|---|---|
| 1,167,358 | 7/1958 | France. |
| 540,580 | 12/1931 | Germany. |

OTHER REFERENCES

The Washington Post (Newspaper), Goodyear Nylon Tank, Aug. 5, 1959, on p. B7 only.

LEO FRIAGLIA, Primary Examiner

U.S. Cl. X.R.

280—179; 150—0.5, 1; 224—42.39; 248—361